2 Sheets--Sheet 1.
A. J. BORLAND.
Improvement in Wheel-Plows.
No. 126,255. Patented April 30, 1872.
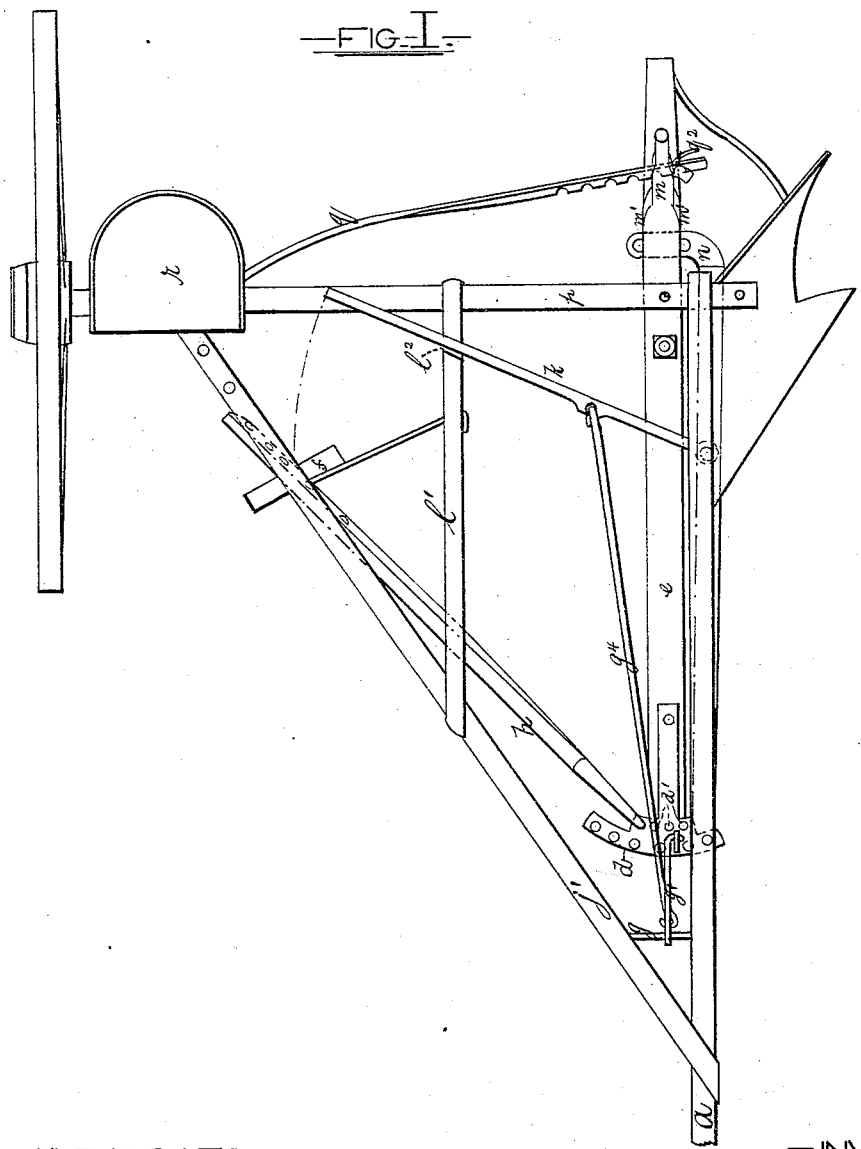
Fig. I.
WITNESSES:
Geo N Howard
John H...
INVENTOR:
Andrew J. Borland, by
Geo E Brown, Atty

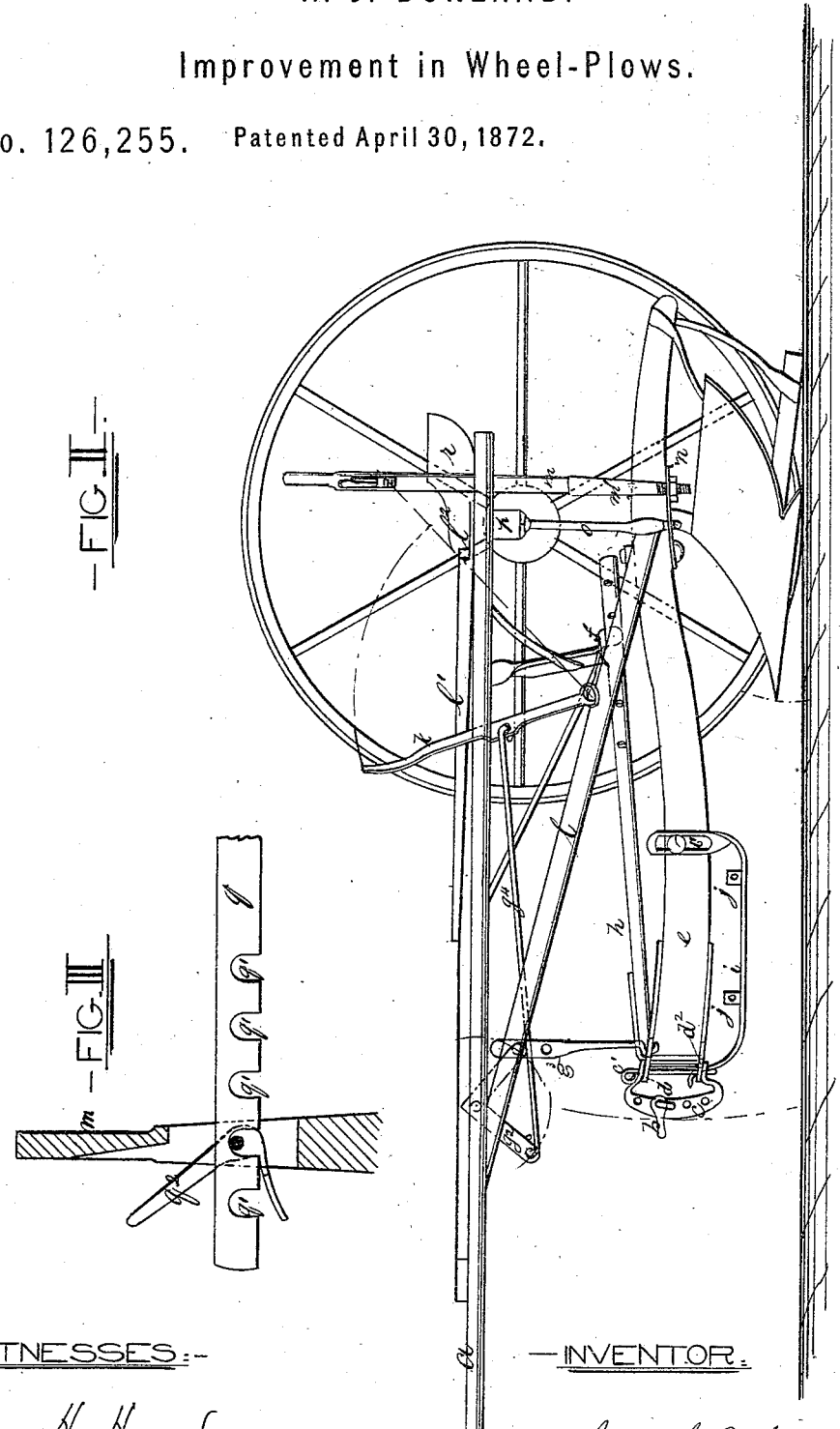

126,255

UNITED STATES PATENT OFFICE.

ANDREW JAMES BORLAND, OF DONALDSON, IOWA.

IMPROVEMENT IN WHEEL-PLOWS.

Specification forming part of Letters Patent No. 126,255, dated April 30, 1872.

Specification describing an Improved One-Wheel Plow, invented by ANDREW J. BORLAND, of Donaldson, Lee county, Iowa.

This invention consists in an improvement upon a former patent for a cultivator, dated August 8, 1871, granted to me, and relates to that class of plows denominated "stubble," and connected with a frame which has but one wheel, the plow itself, in lieu of another wheel, supporting the frame by means of a pendant attached to the same, the manner whereof, together with divers other particulars, being hereinafter fully explained.

Figure 1 is a top or plan view of my invention. Fig. 2 is a side view; and Fig. 3 is a transverse section through lever M.

Of the frame aforesaid, $a$ is the tongue, in connection with which two or more horses placed abreast may be employed, the near horse on one side and the others on the other side of the tongue. The hook of the whiffletree is connected with the clevis $b$, attached to an upright clevis, $c$, that is fastened to perforated plates $d$ $d^2$, secured respectively to the upper and lower sides of the front end of the plow-beam $e$. The clevises $b$ and $c$ are shown as arranged for two horses. When more than two horses are used those on the off side, exerting a greater draft than the single horse on the near side, tend, necessarily, to turn the plow too much to the left. One method of counteracting such tendency is to shift the clevis $c$ to the right of the plow-beam by means of the pin $c'$, and the forward rows of holes in the plates $d$ $d^2$ to a position immediately in rear of the middle horse. Auxiliary to this method is the shifting of the plates $d$ $d^2$ on the plow-beam by means of an inner series of holes, $d^1$, in each plate, through which passes the land-pin at the point of the beam $e$, the removal of the land-pin allowing the plates $d$ $d^2$ to be swung on their pivots either to the right or left. This adjustability of the plates $d$ $d^2$ admits of regulating the draft without changing the beam $e$ at the shank of the plow. Another function of the holes $d^1$ in the plate $d$ is to receive into one of their number a hook on the forward end of a rod, $h$, which passes through a clevis attached to the under side of the foot-rest $f$, said rod being provided with a series of holes, through either of which the pin connecting it with the said clevis may pass. By means of the rod $h$ the point of the beam $e$ may be adjusted so as to give the plow more or less land, as may be desired. A gauge, $i$, is hooked at its front end to the plate $d^2$, and at its rear end said gauge has a slot, $i'$, through which passes the bolt that fastens the gauge to the beam. This fastening renders the gauge adjustable, so that by its use the plow can be run at the desired depth. The gauge is provided with lugs $j'$, to which a colter may be attached. A rock-shaft, $g$, journaled at one end in the tongue $a$ and at the other in an eye extending downward from the brace $j'$, bears an elbow-lever, one arm, $g^1$, of which is connected by a strap, $g^3$, with the plate $d$, while the other arm, $g^2$, is connected by a rod, $g^4$, with a lever, $k$, which is pivoted at one end to the brace $l$ and rests on the brace $l^1$, within reach of the driver. At the back end of the brace $l$ is a notch, $l^2$. By drawing back the lever $k$ the plow is raised, and if the lever $k$ be drawn back as far as the notch $l^2$ the plow is elevated clear of the ground, and held in that position by the lever resting in the notch. This suspension of the plow facilitates turning at the ends of the lands. On throwing the lever $k$ out of the notch $l^2$ the plow enters the ground again. Whenever the plow runs too shallow the driver can make it run deeper by bearing forward on the lever $k$. To the lever $m$ two bars, $m'$, are attached, one at each side, said bars projecting beyond the lower end of the lever, which rests on the beam $e$, and passing one to each side of said beam, the lower extremities of said bars being round and threaded. A bent plate, $n$, is slipped over the threaded bars $m'$, and pressed against the under side of the beam $e$ by means of nuts, thus connecting the lever $m$ and beam $e$ firmly together. To the same bent plate $n$ the lower end of the pendant $o$ is hooked, the upper end of said pendant being attached to the axle $p$. By means of the pendant $o$ the axle is, therefore, supported on the plate $n$. Said pendant and the lever $m$ can be attached in the manner described to any plow-beam, and the same is true of the plates $d$ $d^2$. The function of the lever $m$ is to furnish the means for keeping the plow parallel with the wheel by moving said lever to the right or left, as may be necessary. A bar, $q$, attached at one end to the axle $p$, near the driver's seat $r$, passes through a slot in the lever $m$, said bar having a series of notches, $q^1$, by means of either one of which it can be made to catch on a bolt crossing the slot in $m$, through the medium of which bolt and plate the plow can be held in any one position. An elbow-lever, $q^2$, is pivoted in the slot on the said pin, the lower arm of said lever bearing a spur that extends under the bar $q$. By depressing the lever $q^2$ the plate $q$ can be raised clear of the pin, so as to allow of the shifting of the lever $m$.

I claim as of my invention—

1. The brace-pendant $o$, combined with the axle $p$, plate $n$, bars $m'$, and lever $m$, as specified.

2. The rock-shaft $g$, combined with the elbow-lever $g^1$ $g^2$, strap $g^3$, connecting-rod $g^4$, lever $k$, and plate $d$, as set forth.

3. The plate $d$ having an inner series of holes, $d^1$, and combined with the rod $h$, strap $g^3$, and the land-pin, as specified.

ANDREW JAMES BORLAND.

Witnesses:
WILLIAM R. DONNELL,
JOHN B. WEIR.